Feb. 2, 1943.  C. VOORHIES  2,309,740
INTERNAL COMBUSTION ENGINE
Filed July 24, 1941
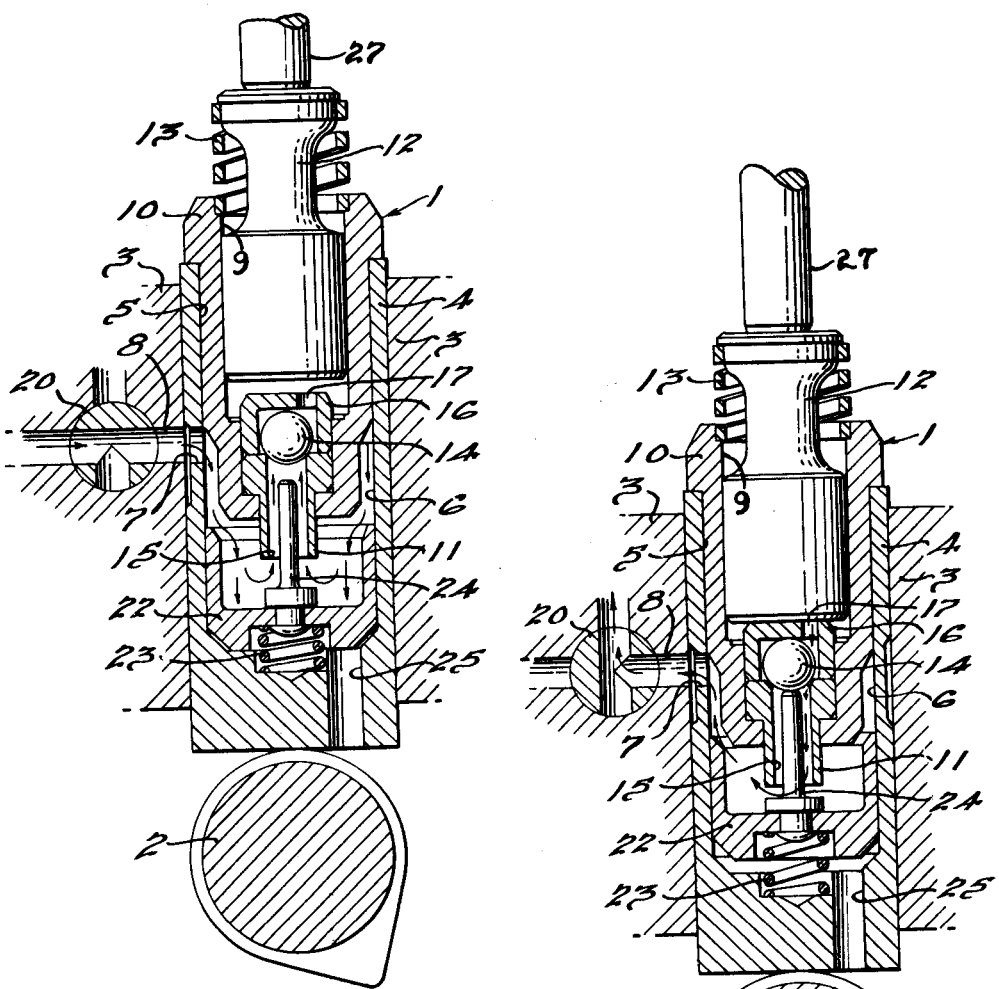
FIG. 1.
FIG. 2.
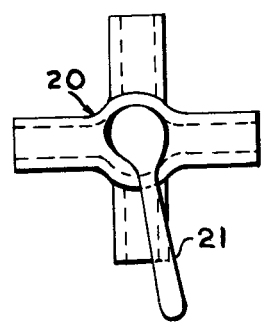
FIG. 3.
INVENTOR
Carl Voorhies.
BY John F. Stark
ATTORNEY Patented Feb. 2, 1943

2,309,740

UNITED STATES PATENT OFFICE 2,309,740

INTERNAL COMBUSTION ENGINE

Carl Voorhies, Detroit, Mich., assignor to Eaton Manufacturing Company, Cleveland, Ohio, a corporation of Ohio Application July 24, 1941, Serial No. 403,849

9 Claims. (Cl. 123—90)

This invention relates to valve timing of internal combustion engines, especially Diesel engines, and, more particularly, concerns automatic self-compensating tappets having means associated therewith for varying the action of such tappets to control the desired valve timing at a selected point of engine operation.

It is known that in starting Diesel engines pressure in the combustion chamber has to reach a certain point before compression ignition occurs. Consequently, it is necessary to turn such an engine up to fairly high speed in starting before the necessary compression will be reached with normal valve timing, in order that the charge will be ignited. On the other hand though, it requires the expenditure of considerable energy to crank such an engine against its normal operating pressure and means have been suggested, for example, holding one or more valves temporarily off its seat to relieve the compression, in order to render cranking the engine easier. When the engine is brought up to starting speed the valves can be dropped or returned to normal operating position and the charge will be ignited under the normal operating pressures.

It will be understood that the Diesel engine is characterized by compression ignition and hence is operated at pressures equal to the flash point of the fuel. In its broad sense, however, this invention is equally applicable to large aircraft engines operable by spark ignition and which are difficult to start because of failure to secure induction of a proper volume of fuel charge at low cranking speeds with normal valve timing set for maximum power. That is to say, in the case of starting, the cylinders are so contracted in their cold condition that the valve overlap is considerably widened so that starting is rendered very difficult. With respect to idling, for example in aircraft engines, where the exhaust valve is held open a considerable number of degrees after top center, air is drawn into the cylinder back through the exhaust port, and there being no throttle control on this air intake a sufficient charge of fuel must be inducted into the cylinder to create a combustible mixture thus necessitating a relatively high R. P. M. With the present improved control means the timing can be changed so that the exhaust valve will close much earlier and the intake valve open much later, thereby eliminating the conditions described and providing better starting and idling. It is also an accepted fact that the timing which produces the best power does not produce the best economy for part load, such as idling or cruising, and where the timing can be closed up for starting, idling, and cruising a considerable fuel saving may be effected. It may also be mentioned that, while the operation of closing up the intake valve event for starting, in Diesel engines, also changes the timing of other valve events the closing of the intake valve is the most important and the change in other valve events is unimportant with respect to starting.

Accordingly, to this end, the primary object of the present invention is the provision in a self-compensating automatic tappet construction, interposed in a valve gear train between the valve and cam thereof for taking up clearance therein due to elongation and contraction under operating temperature variations, of means for rendering the compensating means within the tappet inactive; the provision in a self-compensating automatic tappet construction as above described, in which said means comprises mechanical means, that may be manually or automatically operated incidental to starting the engine for effecting increased valve clearance, i. e. valve lift loss, and which mechanical means is thereafter rendered inactive so as to allow the self-compensating automatic tappet to effect normal valve operation; the provision in an internal combustion engine, provided with self-compensating tappets for effecting operating clearance take-up in the valve train, of means for shortening the compensated length of the tappets incidental to starting the engine whereby the valve timing event is substantially altered and thereafter is changed to optimum valve timing during normal operating conditions in service.

Another object of the invention is the provision, in a hydraulic self-compensating tappet construction, of manual or automatically operated valve means for controlling the supply of operating liquid to such tappets, which upon being closed, renders automatically operative means, normally inactive, in the hydraulic tappet for effecting lift loss in the valve gear and thus substantially closes up the valve event by rendering inactive the compensating means within the tappet; the provision of automatic or manual valve means, for use in conjunction with a tappet construction of a valve train, as above described, which may be controlled at the will of the operator, and including associated means in the tappet construction which shortens the compensated length of the tappet only temporarily and still affords an operable clearance of a simple mechanical tappet dependent upon the operating requirements of the engine.

Further and other objects and advantages of the invention reside in the novel combination and arrangement of parts about to be described, and will become apparent from the accompanying drawing forming a part of this specification, and are pointed out with particularity in the appended claims.

In the drawing like reference characters denote corresponding parts in the different views, and in which:

Fig. 1 is a vertical sectional view through a portion of an internal combustion engine illustrating a valve means associated with a hydraulic self-compensating tappet construction embodying a preferred form of this invention; and Fig. 2 is a similar sectional view of a portion of the tappet of Fig. 1 when the compensated length of the tappet has been rendered inoperative.

Fig. 3 illustrates a valve means for controlling supply of working fluid to the hydraulic tappets.

In the valve action of Diesel engines the intake valve may be held open well beyond bottom center in order to take advantage of the ramming action of the inertia of the charge at higher speeds. The further this intake valve is held open beyond bottom center the higher the speed it is necessary to turn the engine for starting. This will be apparent in view of the fact that at extremely slow speed, for retaining the greatest charge in the cylinder, the intake valve should close at bottom center, and as this speed is increased the intake valve may be held open longer; but where this position of the closing of the intake valve is located for high speed the charge taken into the cylinder is pushed back out of the cylinder from bottom center up to the point where the intake valve is closed. Therefore, the engine must be turned fast enough to retain a sufficient charge to create combustion.

Now having reference to the drawing there is shown a means for altering the valve timing event of an engine according to the teaching of this invention and embodied in a self-compensating automatic tappet construction.

In this instance the self-compensating automatic tappet is of the hydraulic type which, as is well known to those skilled in this art, is interposed in the valve train between the operating cam end of the tappet and the push rod, or directly on the valve stem. The general construction of the hydraulic tappet shown, exclusive of the means for rendering it inactive, is covered in United States patent numbered 2,074,034 issued March 16, 1937 and for the purpose of the present invention only so much of the operation thereof as is necessary to an understanding of this invention will be made, reference may be had to said patent for a more complete explanation of the construction and operation.

Generally designated at 1 is a hydraulic type tappet which in this instance is of a cylindrical or barrel form, although the principle of the invention is equally applicable to a comparable type of tappet having a body of mushroom form, and is operated or reciprocated from its lower end by a cam 2. The tappet and cam are both disposed in proper relation in the block of an internal combustion engine, a portion of which is shown at 3. The tappet generally designated 1 has a tappet body 4 of the barrel type which is provided with a hollow bore 5 open at its upper end for reception of a hydraulic compensating mechanism and closed at its lower end to form a reservoir 6 for operating fluid, in this instance pressure fed oil from the lubricating system of the engine. Operating fluid is supplied through an opening 7 in the side of the tappet body from a pipe line 8, or integral oil conduit in the engine block into the reservoir 6. The upper part of the bore 5 is arranged for reception and support upon the upper end thereof of a cylinder sleeve member 10 which comprises a cylindrical member having an enlarged bore 9 at its upper end and a separate shouldered tubular extension 11 pressed into a reduced bore of the sleeve member at its lower end, which, when the member 10 is inserted in the tappet bore, extends down into the oil supply in the reservoir 6 in the lower end of the tappet body.

Positioned in the cylinder sleeve 10 is a solid plunger 12, the upper end of which contacts the end of a valve stem 27 or other part of the valve train, the plunger being reciprocably mounted therein and adapted to be biased outwardly with respect to the separate cylinder by means of a plunger spring 13. In the lower end of the separate cylinder is a ball check valve 14, or other suitable check valve means, which seats against and controls fluid flow through the upper end of an opening 15 in the tubular extension. A pressed-in retainer cage 16 surrounds the check valve 14, and affords predetermined limited travel thereto, while an opening 17 in the top of the cage communicates with the space between the lower end of the plunger 12 and bottom of the separate cylinder.

In operation of the construction so far described the tappet would function in the usual manner to effect self-compensation, automatically, of any clearance present in the valve train between the camshaft and the valve. As the camshaft rotates and the tappet head rides upon the cam, the tappet body moves downwardly in its guide under the influence of the spring pressed valve stem. Normally and in a rigid and nonextensible type of tappet, the pressure of the valve stem against the end of the tappet would cease shortly before the tappet reached the base circle of the cam; thus relieving substantially all the pressure of the valve upon the tappet. In the device disclosed, however, when the pressure of the valve stem ceases, the coil spring 13 will urge the plunger outwardly and maintain its contact with the valve stem. This outward movement of the plunger will reduce the pressure in the space between the end of the plunger 12 and above and within the ball cage member 16 and permit the ball to rise from its seat, under the relatively greater pressure in the oil reservoir 6. Operating fluid in the reservoir then flows past the ball and fills the space between the end of the plunger and top of the cage member. As the tappet moves upwardly through rotation of the cam, and with the check ball in seated position, oil in the chamber in the lower portion of the cylinder below the plunger will be trapped, thus affording an incompressible hydraulic column which will maintain the plunger 12 in firm contact with the valve stem 1 during the entire stroke of the tappet. The pressure of the plunger against the trapped oil thereunder and relative fit between the plunger 12 and cylinder 10 will cause a slight leakage of the oil outward around the sides of the plunger to give a predetermined rate of fluid escapement. The operating fluid so eliminated will be replaced as the cycle of operation is repeated. If complete loss of operating fluid occurs the plunger will reach the bottom in the cylinder with a resultant lift loss in the valve and increased noise but still sufficient to permit operation of the engine.

The present invention utilizes the ability of the tappet to enable operation of an engine, although with reduced efficiency, under a condition of temporary loss of supply of operating fluid for the very utilitarian purpose of providing easier starting of Diesel or large aircraft engines. To effect this end, in this instance, a valve means generally designated 20 controls flow of operating fluid from the pipe line 8, or oil conduit, to the individual tappets and, as shown in Fig. 1, is in open position. It will be obvious this valve may be manually controlled from a lever arm 21, as in Fig. 3, by the operator or linked up with the starting mechanism to function automatically. Likewise, it could also be associated with any other means for altering the valve timing event. In its broadest sense the invention may be utilized in any automatic self-compensating tappet construction for use in an engine of particular design, whose starting and operating characteristics are best suited to the use of a valve train with a predetermined sequence of tappet compensation, or valve clearance, and the range of compensation built into the tappet construction is provided with means to shorten it to within the operating clearances desired.

Associated with the valve 20, which controls flow of pressure fluid to the tappet body is an inverted piston 22 slidably fitted in the bottom of the fluid reservoir 6 in the tappet body and which is backed up by the spring 23. A stud member 24 which may be riveted through the end of the piston projects upwardly through the opening 15 into the tubular extension 11 where it is terminated, when the piston is in bottom position, just short of the check valve 14. An aperture 25 through the bottom wall of the tappet body 4 vents the lower end of the piston 22 to the atmosphere for a purpose to be presently described.

In operation, the valve 20 is closed, by any of the means above disclosed, when it is desired to start the engine the piston 22, which is normally pressed down on the bottom of the oil reservoir by the pressure of the operating fluid in normal operation of the engine, rises from its seat under the action of the spring 23. The stud 24 upstanding from the end of the piston unseats the check valve 14 and releases fluid trapped thereabove in the high compression chamber, permitting the plunger to bottom and close up the valves to a certain extent, but still sufficient to effect operation of the engine. With this extended position of the piston 22, which causes unseating of the check valve 14, operating fluid remaining in the tappet body is pumped back and forth around the valve instead of being trapped above the valve in the high pressure chamber, as in normal operation. It will thus be seen that while the fluid remaining in the tappet body may pass into the high pressure chamber and is forced back out, due to the trapped check valve, when the load is applied the tappet still remains in a potentially operative condition, hydraulically, so that as soon as pressured operating fluid is restored the piston 22 will be reseated and the check valve 14 freed for normal functioning. The function of the vent opening 25 below the piston 22 will now be obvious as being used to relieve any vacuum effect below the piston so that movement of the piston will be affected only by the presence or absence of pressure of the operating fluid, and the coil spring 23 acting upon the opposite end of the piston.

From the foregoing disclosure, which represents one embodiment of the present invention concerning altering the valve timing of an internal combustion engine and embodied in a novel tappet construction it will be apparent the generic concept of the invention is equally applicable to other self-compensating automatic tappet structures which are desired to have the compensating means therein rendered temporarily inoperative but potentially operative thereafter at the will of the operator.

Formal changes may be made in the specific embodiment of the invention described without departing from the spirit or substance of the invention, the scope of which is commensurate with the following claims.

What I claim is:

1. The combination with an internal combustion engine having a plurality of valves, and a like number of hydraulic self-compensating tappets including check-valves regulating one-way flow of hydraulic operating fluid interposed in the valve train to effect zero clearance between the parts thereof; of check valve disabling means arranged to stop flow of hydraulic operating fluid and thereby temporarily shorten the compensated length of said hydraulic tappets during operation of the engine but to maintain them potentially available for operative condition at the will of the operator.

2. A hydraulic self-compensating tappet construction for use in the valve train of an internal combustion engine comprising in combination check-valve means regulating one-way flow of hydraulic operating fluid, for automatically effecting zero clearance in the valve train during normal operation thereof, and check-valve disabling means operable to stop flow of hydraulic operating fluid to effect a predetermined tappet clearance during operation of the engine to cause substantial lift loss in the valve event but sufficient to enable operation of the engine.

3. A self-compensating tappet construction for use in the valve train of an internal combustion engine comprising in combination, means for automatically effecting zero clearance in the valve train during normal operation thereof, and valve means automatically operable upon initiating starting of the engine to effect a predetermined tappet clearance to cause substantial lift loss in the valve event but sufficient to enable operation of the engine.

4. A self-compensating tappet construction for use in the valve train of an internal combustion engine comprising in combination, means for automatically effecting zero clearance in the valve train during normal operation thereof, and valve means manually operable under control of the vehicle operator upon initiating starting and during operation of the engine to effect a predetermined tappet clearance to cause substantial lift loss in the valve event but sufficient to enable operation of the engine.

5. A hydraulic valve tappet comprising in combination, a tappet body having a longitudinal bore closed at its lower end and open at the upper end and adapted to receive operating liquid, the lower part of said body including a liquid reservoir, a hydraulic compensating mechanism received in the open upper end of said bore, valve means in the hydraulic mechanism regulating liquid movement thereinto, a valve controlled passage regulating flow of operating liquid into the reservoir in said bore, means in the liquid reservoir for rendering inoperative the valve means in the hydraulic compensating mechanism, said means in the liquid reservoir normally rendered inactive by pressure of the operating liquid and active upon closing movement of the valve controlled passage regulating flow of operating fluid into the tappet reservoir to effect shortening of the compensated length of said tappet.

6. A hydraulic valve tappet comprising in combination, a tappet body having a longitudinal bore adapted to receive a hydraulic compensating mechanism therein, a liquid reservoir in the tappet bore, valve means for regulation of liquid into the hydraulic mechanism, and means, hydraulically operated, adapted to hold said valve means open to render it inoperative.

7. A hydraulic valve tappet comprising in combination, a tappet body having a longitudinal bore adapted to receive a hydraulic compensating mechanism therein, a liquid reservoir in the tappet bore, valve means for regulation of liquid into the hydraulic mechanism, and means hydraulically operated in the liquid reservoir adapted to render said valve means inoperative by holding it open whereby operating liquid may be returned to said reservoir.

8. A hydraulic valve tappet comprising in combination, a tappet body having a longitudinal bore adapted to receive a hydraulic compensating mechanism therein, a liquid reservoir in the tappet bore, valve means for regulation of movement of operating liquid into the hydraulic mechanism, means adapted to render said valve means inoperative whereby operating liquid may be returned to said reservoir, said means comprising a spring-pressed piston normally influenced and rendered inactive by pressure of the operating liquid.

9. In a valve tappet of the hydraulic type having a predetermined range of automatic self-compensation built therein for adjustment of clearance dimensions in the valve train of an internal combustion engine, said tappet having a tappet body with a longitudinal bore adapted to receive a hydraulic compensating mechanism, a liquid reservoir in the tappet bore, valve means for regulation of one-way movement of operating liquid into the hydraulic mechanism to effect the necessary range of compensated length of said tappet, and means hydraulically operated to render said one-way valve means inactive by holding it open to shorten the compensated length of said tappet.

CARL VOORHIES.